(12) United States Patent
Takahashi et al.

(10) Patent No.: US 7,361,701 B2
(45) Date of Patent: *Apr. 22, 2008

(54) ALIPHATIC POLYESTER COMPOSITION, A MOLDED ARTICLE THEREOF AND A METHOD FOR CONTROLLING BIODEGRADATION RATE USING THE SAME COMPOSITION

(75) Inventors: Ikuo Takahashi, Chiba (JP); Hirotaka Iida, Chiba (JP); Norimasa Nakamura, Chiba (JP); Yoshihiro Yamazaki, Chiba (JP); Tsuyoshi Takeuchi, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 457 days.

This patent is subject to a terminal disclaimer.

(21) Appl. No.: 10/698,934

(22) Filed: Nov. 3, 2003

(65) Prior Publication Data

US 2004/0132860 A1 Jul. 8, 2004

(30) Foreign Application Priority Data

Nov. 8, 2002 (JP) ............................. 2002-325201

(51) Int. Cl.
*C07D 209/76* (2006.01)
*C09B 67/00* (2006.01)
*C08K 5/29* (2006.01)

(52) U.S. Cl. ..................... 524/86; 524/89; 524/90; 524/91; 524/195

(58) Field of Classification Search ................ 524/86, 524/89, 90, 91, 195
See application file for complete search history.

(56) References Cited

U.S. PATENT DOCUMENTS

| | | | | |
|---|---|---|---|---|
| 2,941,956 A | | 6/1960 | Bergstrom | 502/45 |
| 4,500,686 A | * | 2/1985 | Kobayashi et al. | 525/408 |
| 5,484,881 A | | 1/1996 | Gruber et al. | 528/354 |
| 5,616,657 A | * | 4/1997 | Imamura et al. | 525/437 |
| 5,714,220 A | | 2/1998 | Kage et al. | 428/36.8 |
| 5,759,569 A | * | 6/1998 | Hird et al. | 424/443 |
| 5,900,439 A | * | 5/1999 | Prissok et al. | 521/128 |
| 6,207,235 B1 | * | 3/2001 | Ohsawa et al. | 427/372.2 |
| 6,353,021 B1 | * | 3/2002 | Gaglani et al. | 514/478 |
| 6,527,995 B1 | * | 3/2003 | Kaufhold et al. | 264/126 |
| 6,559,266 B2 | * | 5/2003 | Kaufhold et al. | 528/76 |
| 6,803,443 B1 | * | 10/2004 | Ariga et al. | 528/354 |
| 6,855,758 B2 | * | 2/2005 | Murschall et al. | 524/195 |
| 2002/0128344 A1 | * | 9/2002 | Fujihira et al. | 522/162 |
| 2003/0091843 A1 | * | 5/2003 | Murschall et al. | 428/480 |
| 2005/0233142 A1 | * | 10/2005 | Takahashi et al. | 428/364 |
| 2006/0003085 A1 | * | 1/2006 | Takahashi et al. | 427/60 |

FOREIGN PATENT DOCUMENTS

| | | |
|---|---|---|
| DE | 196 30 599 | 2/1998 |
| EP | 0 890 604 | 1/1999 |
| EP | 1 193 050 | 4/2002 |
| JP | 47-33279 | 8/1972 |
| JP | 4-168149 | 6/1992 |
| JP | 6-184417 | 7/1994 |
| JP | 9-12688 | 1/1997 |
| JP | 11-80522 | 3/1999 |
| JP | 2001-525473 | 12/2001 |
| JP | 2002-114893 | 4/2002 |

OTHER PUBLICATIONS

T. W. Campbell and K. C. Smeltz; Carbodiimides. IV., *High Polymers Containing the Carbodiimide Repeat Unit*; J. Org. Chem. 28, pp. 2069-2075, Aug. 1963.

Williams and Ibrahim; *Carbodiimide Chemistry*; Chemical Reviews, 1981, vol. 81, No. 4, pp. 619-621.

XP-0022666309, Nagano et al.; *Fire-, heat-, and hydrolysis-resistant polyester elastomer compositions*; JP 11-021436, Abstract, Jan. 26, 1999.

Communication dated Jan. 26, 2004 with European Search Report.

* cited by examiner

*Primary Examiner*—Nathan M. Nutter
(74) *Attorney, Agent, or Firm*—Westerman, Hattori, Daniels & Adrian, LLP.

(57) ABSTRACT

A biodegradable plastic composition which can be stably adjusted in biodegradation rate, and has greatly improved resistance to hydrolysis and weather, in particular the former, and durability resulting from the improved resistances; a molded article thereof; and a method for controlling biodegradation rate using the same composition. The biodegradable plastic composition comprising (A) 100 parts by weight of biodegradable plastic, (B) 0.01 to 10 parts by weight of a carbodiimide compound and (C) 0.01 to 10 parts by weight of at least one compound selected from the group consisting of benzotriazole-, triazine- and hydroxylamine-based compounds; the molded article thereof; and the method for controlling biodegradation rate using the same composition.

8 Claims, No Drawings

ALIPHATIC POLYESTER COMPOSITION, A MOLDED ARTICLE THEREOF AND A METHOD FOR CONTROLLING BIODEGRADATION RATE USING THE SAME COMPOSITION

BACKGROUND OF THE INVENTION

1. Field of the Invention

The present invention relates to a biodegradable plastic composition, a molded article thereof and a method for controlling a biodegradation rate using the same composition. In more detail, the present invention relates to a biodegradable plastic composition which exhibits greatly improved resistance to hydrolysis and weather, in particular the former, by compounding specified agents therein and has excellent durability resulting from the improved resistance. Applications of the composition include a biodegradable molded article. A method for controlling a biodegradation rate of the biodegradable plastic is also disclosed.

2. Description of the Prior Art

Recently, research and development of biodegradable plastic have been promoted because of increasing attention to a need for and a significance of environmental preservation and problems such as environmental contamination caused by plastic waste.

The biodegradable plastics are roughly classified into aliphatic polyesters having polyester groups in a molecular backbone thereof (including those produced by microorganisms), natural macromolecule type polymers such as cellulose, polysaccharides produced by microorganisms, polyvinyl alcohol (PVA) and polyethers such as polyethylene glycol (PEG).

Among them, aliphatic polyesters have not been utilized as the biodegradable plastic because they have, in general, low melting points and poor heat stabilities in their production stages, and a sufficiently large molecular weight has not been obtained to provide physical properties suitable for practical molded articles. However, with technological developments to solve these problems, a high molecular weight of aliphatic polyester has come out and started to be used as materials for agriculture, forestry and fishery (mulch films, plantation pots, fishing lines, fishing nets, and the like), materials for civil engineering work (water holding sheets, nets for plants, sandbags, and the like) and packaging and containers (those difficult to recycle due to adhered soil, foods, and the like).

The biodegradable plastics including the above-described aliphatic type polyesters, however, should not only have the same level of functions as the conventional plastics (in characteristics such as strength, water resistance, formability and heat resistance) in use, but also be rapidly degradable by microorganisms generally present in nature.

Based on these situations, several methods for controlling the degradation rate of the biodegradable plastic have been proposed. For example, a method aiming at shortening of a degradation period by an addition of hydrolase (disclosed by JP-A-4-168149 (refer to claims or the like)), and another method aiming at an extension of the degradation period by reducing unreacted monomers and impurities in a polymer and low molecular weight compounds such as linear or cyclic oligomers (disclosed by JP-A-9-12688 (refer to claims or the like)), are known.

Notwithstanding these proposals, however, the biodegradable plastic consisting of the aliphatic polyester according to the conventional art has such problems as a hydrolysis reaction progressing in the aliphatic polyester induced by exposure to moisture in an ambient atmosphere or by being heated during a production process of pellets-which are raw materials of plastic products, or in a production process of products from said pellets, leading to lowering or dispersion of initial properties of molded articles as well as an unstable biodegradability of products. Therefore, adjustment of the biodegradability, that is, biodegradation rate, is not yet sufficient.

The present inventors proposed, as disclosed by, e.g., JP-A-11-80522 (refer to claims or the like), a biodegradable plastic composition with an adjusted biodegradation rate by compounding a carbodiimide compound into the biodegradable plastic. This proposal improved a hydrolysis resistance or a function for adjusting biodegradability, although not to a sufficient extent. The proposal also had another problem of losing transparency of the product, in particular, in a polylactic acid based biodegradable plastic product with an increased compounding amount of the carbodiimide compound to enhance the hydrolysis resistance.

JP-A-2001-525473 (refer to claims or the like), for example, also proposes a method aiming at an extension of the degradation period by compounding an aromatic carbodiimide as a hydrolysis stabilizer to the biodegradable polymer. This method, however, involves problems, because the biodegradable polymer it gives shows insufficient, although improved, hydrolysis resistance, decreased transparency irrespective of an additional amount of the stabilizer, and insufficient weather resistance.

Moreover, JP-A-6-184417 (refer to claims or the like), for example, proposes a lactic-based composition characterized by a lactic-based polymer as a biodegradable polymer compounded with at least one type of additive selected from the group consisting of ultraviolet absorber and light stabilizer at 0.001 to 5 parts by weight per 100 parts by weight of the polymer. However, this invention is aimed at controlling decomposition of the polymer by solar rays, but not at controlling hydrolysis.

Still more, JP-A-2002-114893 (refer to claims or the like), for example, proposes a thermoplastic polyester resin composition, although not biodegradable, characterized by a thermoplastic polyester resin compounded with a resin-based ultraviolet absorber and aliphatic-based polycarbodiimide compound to improve resistances of the resin, which has relatively high heat resistance, to weather, alkali and hydrolysis. However, the resin-based ultraviolet absorber disclosed by the document involves a problem of being not compatible with a biodegradable plastic.

SUMMARY OF THE INVENTION

Therefore, it is an object of the present invention to solve the problems of the conventional art and to provide a biodegradable plastic composition capable of adjusting its biodegradation rate, greatly improved in resistance to hydrolysis and weather, in particular the former, and excellent in durability resulting from the improved resistances. It is another object of the present invention to provide a molded article of the composition. It is still another object of the present invention to provide a method for controlling biodegradation rate of the biodegradable plastic.

The present inventors, after an extensive study to solve the above-described problems of the conventional art, found that compounding specified amounts of a carbodiimide compound (including a polycarbodiimide compound) having at least one carbodiimide group in the molecule and a specified compound in a biodegradable plastic, in particular, an aliphatic polyester, could improve the resulting biodegradable plastic composition in resistance to hydrolysis and weather, in particular in hydrolysis resistance resulting from the synergistic effect by the carbodiimide compound and specified compound, and thereby could adjust biodegradation rate of the biodegradable plastic. The present invention was thus accomplished based on these findings.

The first aspect of the present invention provides a biodegradable plastic composition comprising (A) 100 parts by weight of biodegradable plastic, (B) 0.01 to 10 parts by weight of a carbodiimide compound, and (C) 0.01 to 10 parts by weight of at least one compound selected from the group consisting of benzotriazole-, triazine- and hydroxylamine-based compounds.

The second aspect of the present invention provides the biodegradable plastic composition of the first aspect, characterized in that the benzotriazole-based compound is a benzotriazole-based ultraviolet absorber.

The third aspect of the present invention provides the biodegradable plastic composition of the first aspect, characterized in that the triazine-based compound is a triazine-based ultraviolet absorber or triazine derivative having at least one amino group in the molecule.

The fourth aspect of the present invention provides the biodegradable plastic composition of the first aspect, characterized in that the hydroxylamine-based compound is N-hydroxybenzotriazole, N-hydroxysuccinimide or a derivative thereof.

The fifth aspect of the present invention provides the biodegradable plastic composition of the first aspect, characterized in that the biodegradable plastic (A) is an aliphatic-based polyester.

The sixth aspect of the present invention provides the biodegradable plastic composition of the first aspect, characterized in that the carbodiimide compound (B) is aliphatic polycarbodiimide.

The seventh aspect of the present invention provides the biodegradable plastic composition of the sixth aspect, characterized in that the aliphatic polycarbodiimide compound has an isocyanate terminal.

The eighth aspect of the present invention provides a molded article of a biodegradable plastic obtained by molding the biodegradable plastic composition of any one of the first to seventh aspects.

The ninth aspect of the present invention provides the molded article of the biodegradable plastic of the eighth aspect, which is in the form of molded article, extrudate, blow-molded article, thermally molded article, fiber, non-woven fabric, film or sheet.

The tenth aspect of the present invention provides a method for controlling biodegradation rate of a biodegradable plastic, characterized in that a biodegradable plastic (A) is compounded with a carbodiimide compound (B) and at least one compound (C) selected from the group consisting of benzotriazole-, triazine- and hydroxylamine-based compounds in such a way to adjust its biodegradability.

As described above, the present invention relates to a biodegradable plastic composition and the like, characterized in that a biodegradable plastic (A) is compounded with specified amounts of a carbodiimide compound (B) and specified compound (C), and the preferred embodiments thereof include the following:

(1) The biodegradable plastic composition of the first aspect, characterized in that it comprises 100 parts by weight of the biodegradable plastic (A); 0.1 to 5 parts by weight of the carbodiimide compound (B); and 0.1 to 5 parts by weight of the compound (C).

(2) The biodegradable plastic composition of the third aspect, characterized in that the triazine-based compound is a triazine-based ultraviolet absorber.

(3) The biodegradable plastic composition of the fourth aspect, characterized in that the hydroxylamine-based compound is N-hydroxybenzotriazole.

(4) The biodegradable plastic composition of the fifth aspect, characterized in that the aliphatic-based polyester is a polylactic acid-based polyester.

DETAILED DESCRIPTION OF THE INVENTION

Hereinbelow, the present invention will be described in detail for each element.

The biodegradable plastic composition of the present invention comprises (A) a biodegradable plastic compounded with (B) a carbodiimide compound and (C) at least one compound selected from the group consisting of benzotriazole-, triazine- and hydroxylamine-based compounds.

1. Biodegradable Plastic (A)

The examples of the biodegradable plastic as a main component used in the biodegradable plastic compound of the present invention include those derived from polyesters metabolized by microorganisms, of which aliphatic polyesters are more preferable because they are easily metabolized by microorganisms.

In general, the biodegradable plastic is believed to undergo biodegradation through the following processes.

Namely, in a decomposition of a polymer material (biodegradable plastic) discharged into an environment, (i) a polymer degrading enzyme is adsorbed on the surface of the polymer material. This enzyme is a substance secreted extracellularly by a certain kind of microorganism. (ii) The enzyme, then, breaks such chemical bonds of polymer chains as ester, glycosidic and peptide linkages by a hydrolysis reaction. (iii) As a result, the polymer material is reduced in molecular weight and decomposed even to a monomer unit by a degrading enzyme. (iv) Finally, decomposed products are further metabolized and utilized by various microorganisms and converted into carbon dioxide, water and bacterial cell components.

On the other hand, poly($\alpha$-oxyacid) represented by polylactic acid, is believed to undergo biodegradation in 2 stages.

In the primary stage, a high-molecular-weight polylactic acid is decomposed mainly by simple hydrolysis involving no microorganisms, because it is difficult to decompose by microorganisms. When decomposed to have a number-average molecular weight (Mn) of the order of 10,000 to 20,000, it will undergo the secondary decomposition stage proceeding in the presence of a microbial polymer degrading enzyme, in addition to the simple hydrolysis. The second stage decomposes the polylactic acid even to a monomer unit. The decomposed products are further metabolized and utilized by various microorganisms and converted into carbon dioxide, water and bacterial cell components.

The aliphatic polyesters which are easily metabolized and hydrolyzed by microorganisms include:

(1) polylactic acid (polylactide) type aliphatic polyester;

(2) aliphatic polyester as a product of condensation reaction of polyvalent alcohol and polybasic acid;

(3) aliphatic polyester produced by microorganisms such as polyhydroxybutylate (PHB); and (4) polycaprolactone (PCL) type aliphatic polyester. Any of the above aliphatic polyesters can be preferably used as the biodegradable plastic for the present invention.

Further, in the present invention, the biodegradable plastic is not limited to the above-described aliphatic polyesters but any types thereof can be used as long as they have such chemical bonds as ester, glycosidic and peptide linkages which facilitate a scission of a polymer chain in the biodegradable plastic by the hydrolysis reaction. Such type of polymers include, for example, a carbonate copolymer of the aliphatic polyester produced by randomly introducing a carbonate structure into a molecular chain backbone of the aliphatic polyester, and a copolymer of the aliphatic polyester having amide bonds and a polyamide produced by introducing nylon into a molecular chain backbone of the aliphatic polyester.

Next, the aliphatic polyesters will be further described in more detail.

(1) Polylactic Acid (Polylactide) Type Aliphatic Polyester

The polylactic acid (polylactide) type aliphatic polyesters include polylactides, and specifically polymers of oxyacids such as lactic acid, malic acid and glycolic acid and copolymers thereof including, for example, polylactic acid, poly ($\alpha$-malic acid), polyglycolic acid and a copolymer of glycolic acid and lactic acid, in particular, a hydroxycarboxylic acid type aliphatic polyesters, typically represented by polylactic acid.

The above-described polylactic acid type aliphatic polyester can be obtained, in general, by a ring-opening polymerization method of lactide, as a cyclic diester, and corresponding lactone (a lactide method), as well as a direct dehydration condensation method of lactic acid and a polycondensation method of formalin and carbon dioxide, as a method other than the lactide method.

Further, examples of the catalyst for producing the above-described polylactic acid type aliphatic polyester include tin, antimony, zinc, titanium, iron and aluminum compounds. Among them, a tin-based or aluminum-based catalyst is more preferable, and tin octoate and aluminum acetylacetonate are particularly preferable.

Among the above-described polylactic acid type aliphatic polyesters, poly(L-lactic acid) obtained by the ring-opening polymerization of the lactide is preferable, because poly(L-lactic acid) is hydrolyzed to L-lactic acid, whose safety has already been confirmed. However, the polylactic acid type aliphatic polyesters useful for the present invention are not limited to the above type polyesters, and therefore the lactide used for producing the polylactic acid is also not limited to L-type.

(2) Aliphatic Polyester as a Product of Condensation Reaction of Polyvalent Alcohol and Polybasic Acid.

Examples of the aliphatic polyester as a product of condensation reaction of polyvalent alcohol and polybasic acid include an aliphatic glycol/polybasic acid type polyester obtained by reacting an aliphatic glycol with aliphatic polybasic acid (or anhydride thereof) in the presence of a catalyst, or a high-molecular-weight aliphatic glycol/polybasic acid type polyester obtained in the presence of a small amount of coupling agent, if necessary.

The aliphatic glycols for producing the aliphatic glycol/polybasic acid type polyesters useful for the present invention include, for example, ethylene glycol, 1,4-butandiol, 1,6-hexanediol, decamethylene glycol, neopentyl glycol and 1,4-cyclohexanedimethanol. Ethylene oxide can be also used. These glycols may be used in combination.

Examples of the aliphatic polybasic acid or anhydride thereof to form the aliphatic glycol/polybasic acid type polyester by the reaction with the above-described aliphatic glycol include succinic acid, adipic acid, suberic acid, sebacic acid, dodecanic acid, and succinic anhydride and adipic anhydride, which are generally available in the market, and can be used for the present invention. These polybasic acids and anhydrides thereof may be used in combination.

The above-described glycols and polybasic acids are of an aliphatic type. They may be compounded with a small amount of another component, such as aromatic glycol or aromatic polybasic acid (terephthalic acid, trimellitic anhydride, pyromellitic anhydride or the like).

In addition, examples of the catalyst to produce the above-described aliphatic glycol/polybasic acid type polyester are salts of organic acids, alkoxides and oxides of such metals as titanium, tin, antimony, cerium, zinc, cobalt, iron, lead, manganese, aluminum, magnesium and germanium, and among them, a tin-based or aluminum-based compound is more preferable.

The above-described aliphatic glycol/polybasic acid type polyester may be produced by reacting an equivalent amount of the aliphatic glycol and aliphatic polybasic acid together with the catalyst by heating, using a solvent appropriately selected depending on raw material compounds, if necessary, and a prepolymer with a low degree of polymerization can be produced by controlling progress of the reaction.

In the production of the above-described aliphatic glycol/polybasic acid type polyester, a coupling agent can be used, in particular, for the prepolymer with a low degree of polymerization, to further increase its number-average molecular weight. Examples of the coupling agent include diisocyanate, oxazoline, diepoxy compounds and acid anhydrides, and particularly diisocyanate is preferably used.

The diisocyanate as the above-described coupling agent is not specifically limited in type. They include 2,4-tolylene diisocyanate, a mixture of 2,4-tolylene diisocyanate and 2,6-tolylene diisocyanate, diphenylmethane diisocyanate, 1,5-naphthalene diisocyanate, xylylene diisocyanate, hydrogenated xylylene diisocyanate, hexamethylene diisocyanate, isophorone diisocyanate and 4,4'-dicyclohexylmethane diisocyanate. Hexamethylene diisocyanate is particularly preferable in view of a hue of the aliphatic glycol/polybasic acid type polyester obtained and reactivity while being compounded into the above-described prepolymer.

Amount of the above-described coupling agent is 0.1 to 5 parts by weight, preferably 0.5 to 3 parts by weight based on 100 parts by weight of the above-described prepolymer. An amount less than 0.1 parts by weight results in an insufficient extent of the coupling reaction, whereas an amount above 5 parts by weight tends to cause gelation.

Moreover, the above-described aliphatic glycol/polybasic acid type polyester may have a terminal hydroxyl group capped by another compound via a double bond, urethane bond or urea bond, or a modified one.

Typical examples of the aliphatic polyester on the markets, as a condensation product of polyvalent alcohol and polybasic acid, are polybutylene succinate (PBS) and polyethylene succinate (PES).

Examples of the polybutylene succinate (PBS) type aliphatic polyester are, for example, polybutylene succinate (PBS) made from butanediol and succinic acid, an adipate copolymer (PBSA) obtained by copolymerizing adipic acid to accelerate biodegradability, and adipate/terephthalate copolymer obtained by copolymerizing terephthalic acid. The commercial products include "BIONOLLE®", "ENPOL®", "ECOFLEX®" and "BIOMAX®" supplied by Showa Highpolymer, Ire Chemical, BASF and Du Pont, respectively.

In addition, poly(ethylene succinate (PES) is also commercially available, and a commercial product such as "LUNARLE SE®" is supplied by Nippon Shokubai.

(3) Aliphatic Polyester Produced by Microorganisms

Certain kinds of microorganisms accumulate a polyester in their cells. The polyester produced by microorganisms is a thermoplastic polymer with a melting point derived from the organisms. Such a polyester is decomposed by an enzyme secreted extracellularly by a microorganism in a natural environment and completely disappears because decomposition products are consumed by the microorganism.

Such (aliphatic) polyesters produced by microorganisms include polyhydroxybutyrate (PHB), poly(hydroxybutyric acid-hydroxypropionic acid) copolymer and poly(hydroxybutyric acid-hydroxyvaleric acid) copolymer.

(4) Polycaprolactone (PCL) Type Aliphatic Polyester

Polycaprolactone, a kind of aliphatic polyester, is obtained by a ring-opening polymerization of ε-caprolactone, and can be decomposed by various bacteria, although it is a water-insoluble polymer.

Polycaprolactone is an aliphatic polyester expressed by a general formula: —$O(CH_2)_5CO)_n$—, and as a commercial product of the polycaprolactone type aliphatic polyester, for example, "TONE®" supplied from Nippon Unicar is known.

2. Carbodiimide Compound (B)

As the carbodiimide compounds (including polycarbodiimide compounds) having at least one carbodiimide group in the molecule, useful for the present invention, those synthesized by commonly well known methods may be used. The compound can be obtained, for example, by conducting a decarboxylation condensation reaction of various polyisocyanates in the presence of an organophosphorus or organometallic compound as a catalyst at a temperature not lower than about 70° C., without using any solvent or using an inert solvent.

Examples of the monocarbodiimide compound included in the above-described carbodiimide compounds are dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide and di-β-naphthylcarbodiimide, and among them, dicyclohexylcarbodiimide and diisopropylcarbodiimide are particularly preferable because of their industrial availability.

Further, as the polycarbodiimide compound included in the above-described carbodiimide compounds, those produced by various methods may be used, but basically those produced by conventional production methods for polycarbodiimide [for example, the methods disclosed in U.S. Pat. No. 2,941,956, JP-B-47-33279, J. Org. Chem. 28, 2069-2075 (1963) and Chemical Review 1981, Vol. 81, No. 4, p 619-621] can be used.

Examples of organic diisocyanate, as a raw material for producing a polycarbodiimide compound include, for example, aromatic diisocyanate, aliphatic diisocyanate, alicyclic diisocyanate and a mixture thereof, and specifically include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate and 1,3,5-triisopropylbenzene-2,4-diisocyanate.

In addition, in the case of the above-described polycarbodiimide compound, its degree of polymerization can be controlled to an appropriate level by terminating the polymerization reaction before it is completed by cooling or the like. In such a case, it has isocyanate at the terminal. Moreover, the remaining isocyanate at the terminal may be capped totally or partly by use of a compound such as monoisocyanate capable of reacting with the terminal isocyanate group of the polycarbodiimide compound, in order to control its degree of polymerization to an appropriate level. Controlling its degree of polymerization is preferable for improved quality, resulting from improved compatibility with the polymer and storage stability.

Examples of the monoisocyanate for controlling degree of polymerization of the polycarbodiimide compound by capping its terminal group include phenyl isocyanate, tolyl isocyanate, dimethylphenyl isocyanate, cyclohexyl isocyanate, butyl isocyanate and naphthyl isocyanate.

Further, the terminal capping agents for controlling degree of polymerization of the polycarbodiimide compound by capping its terminal group are not limited to the above-described monoisocyanates, and include compounds having active hydrogen capable of reacting with isocyanate. These compounds include (i) aliphatic, aromatic or alicyclic compounds having —OH group, such as methanol, ethanol, phenol, cyclohexanol, N-methylethanolamine, polyethylene glycol monomethyl ether and polypropylene glycol monomethyl ether; (ii) compounds having a =NH group, such as diethylamine and dicyclohexylamine; (iii) compounds having a —$NH_2$ group, such as butylamine and cyclohexylamine; (iv) compounds having a —COOH group, such as succinic acid, benzoic acid and cyclohexanoic acid; (v) compounds having a —SH group, such as ethylmercaptan, allylmercaptan and thiophenol; (vi) compounds having an epoxy group; and (vii) acid anhydrides, such as acetic anhydride, methyltetrahydrophthalate anhydride, and methylhexahydrophthalic anhydride.

The decarboxylation condensation reaction of the above-described organic diisocyanate is performed in the presence of a suitable carbodiimidation catalyst. The carbodiimidation catalysts preferable for the present invention include an organophosphorus compound, and organometallic compound [expressed by the general formula M—$(OR)_4$, wherein M is titanium (Ti), sodium (Na), potassium (K), vanadium (V), tungsten (W), hafnium (Hf), zirconium (Zr), lead (Pb), manganese (Mn), nickel (Ni), calcium (Ca), barium (Ba) or the like, and R is an alkyl or aryl group having carbon atoms of 1 to 20], of which phospholeneoxide as the organophosphorus compound and alkoxide of titanium, hafnium or zirconium as the organometallic compound are particularly preferable from the viewpoint of activity.

The above-described phospholeneoxides include specifically 3-methyl-1-phenyl-2-phospholene-1-oxide, 3-methyl-1-ethyl-2-phospholene-1-oxide, 1,3-dimethyl-2-phospholene-1-oxide, 1-phenyl-2-phospholene-1-oxide, 1-ethyl-2-phospholene-1-oxide, 1-methyl-2-phospholene-1-oxide and double bond isomers thereof, of which 3-methyl-1-phenyl-2-phospholene-1-oxide is particularly preferable because of its industrial availability.

The inventors of the present invention consider that the carbodiimide compound (B) in the biodegradable plastic composition of the present invention has the following functions: first, it reacts with the residual hydroxyl or carboxyl group in the biodegradable compound, which is considered to accelerate the hydrolysis, during the initial stage after it is compounded to control the hydrolysis. Then it is added to the bonds in the biodegradable plastic cleaved by the hydrolysis to recombine them.

The carbodiimide compound useful for the present invention is not limited so long as it has at least one carbodiimide group to realize the above functions. However, an aliphatic polycarbodiimide compound is preferable because of its safety, stability and compatibility with the biodegradable plastic.

An aliphatic carbodiimide compound having an isocyanate group at the terminal is particularly preferable because of its hydrolysis resistance.

Moreover, an aliphatic carbodiimide compound is more preferable than an aromatic carbodiimide compound viewed from its resistance to hydrolysis and weather, and compatibility with the biodegradable plastic.

Amount of the carbodiimide compound (B) is preferably 0.01 to 10 parts by weight, more preferably 0.1 to 5 parts by weight, particularly preferably 0.1 to 3 parts by weight based on 100 parts by weight of the biodegradable plastic. An amount less than 0.01 parts by weight may give no effect on adjustment or control of the biodegradation rate of the biodegradable plastic composition, whereas the amount over 10 parts by weight may reduce the biodegradability of the biodegradable plastic, and furthermore may deteriorate its transparency, which may cause problems for those purposes in which transparency is required.

3. Compound (C)

The biodegradable plastic composition of the present invention includes at least one compound (Compound (C)) selected from the group consisting of benzotriazole-, triazine- and hydroxylamine-based compounds.

The compound (C) imparts a notable effect of hydrolysis resistance to the biodegradable plastic composition by preventing hydrolysis of the biodegradable plastic, when used in combination with the carbodiimide compound (B).

(1) Benzotriazole-Based Compound

Examples of the benzotriazole-based compound as one of those for the compound (C) to be compounded in the biodegradable plastic composition of the present invention include those normally used as organic ultraviolet absorbers and for peptide condensation. It may be merely benzotriazole or its derivative.

The benzotriazole-based compound used as an ultraviolet absorber (UVA) is not limited, so long as it is normally used as an ultraviolet absorber. They include 2-(2'-hydroxy-5'-methylphenyl)benzotriazole, 2-(2'-hydroxy-5'-t-butylphenyl)benzotriazole, 2-(2'-hydroxy-3'-t-butyl-5'-methylphenyl)-5-chlorobenzotriazole, 2-(3,5-di-t-butyl-2-hydroxyphenyl)-5-chlorobenzotriazole, 2-[2'-hydroxy-3',5'-bis(α, α-dimethylbenzyl)phenyl]benzotriazole and 2-(2'-hydroxy-3',5'-di-t-butylphenyl)benzotriazole.

More specifically, the commercial products include "TINUVIN 234®," "TINUVIN 320®," "TINUVIN 326®," "TINUVIN 327®," "TINUVIN 328®" and "TINUVIN P®" supplied by Ciba Specialty Chemicals, and "SUMISORB 340®" supplied by Sumitomo Chemical.

Examples of the benzotriazole-based compound for peptide condensation include N-hydroxybenzotriazole (or 1-hydroxybenzotriazole) and its derivative.

(2) Triazine-Based Compound

Examples of the triazine-based compound as one of those for the compound (C) to be compounded in the biodegradable plastic composition of the present invention include those normally used as organic ultraviolet absorbers and those having at least one amino group in the molecule.

The triazine-based compound used as an ultraviolet absorber (UVA) is not limited, so long as it is normally used as an ultraviolet absorber. They include 2-(4,6-diphenyl-1,3,5-triazin-2-yl)-5-[(hexyl)oxy]phenol and 2-[4,6-bis(2,4-dimethylphenyl)-1,3,5-triazin-2-yl]-5-[(oc tyl)oxy]phenol. More specifically, the commercial products include "TINUVIN 1577®" supplied by Ciba Specialty Chemicals, and "CYASORB UV-1164®" supplied by Cytec Industries.

The triazine derivatives having at least one amino group in the molecule include 2,4,6-triamino-1,3,5-triazine (or melamine), 2,4-diamino-6-phenyl-1,3,5-triazine (or benzoguanamine), 2,4-diamino-6-methyl-1,3,5-triazine, 2,4-diamino-6-(2-(dodecasylamino)ethyl)-1,3,5-triazine, 2,4-diamino-6-(o-methoxyphenyl)-1,3,5-triazine, 4,6-diamino-1,2-dihydro-2,2-dimethyl-1-(2,6-xylyl)-1,3,5-triazine, 2,4-diamino-6-(2-methoxyethyl)-1,3,5-triazine, 2-amino-4-ethyl-1,3,5-triazine, 2-amino-4-phenyl-1,3,5-triazine, 2-amino-4-ethyl-6-methyl-1,3,5-triazine, 2-amino-4-ethyl-6-phenyl-1,3,5-triazine, 2-amino-4-methyl-6-phenyl-1,3,5-triazine and 2,4-bis(n-octylthio)-6-(4-hydroxy-3,5-di-t-butylanilino)-1,3,5-triazine. More specifically, the commercial products include "IRGANOX565®" and "CHIMASSORB119FL®, supplied by Ciba Specialty Chemicals. The triazine derivative useful for the present invention is not limited to the above, and any triazine derivative may be used so long as it has at least one amino group in the molecule.

(3) Hydroxylamine-Based Compound

Examples of the hydroxylamine-based compound as one of those for the compound (C) to be compounded in the biodegradable plastic composition of the present invention include those used for peptide condensation. They include N-hydroxybenzotriazole (1-hydroxybenzotriazole), N-hydroxysuccinimide and a derivative thereof. N-hydroxybenzotriazole is also cited as one of the benzotriazole-based compounds described above.

The compound (C) is compounded in the biodegradable plastic composition of the present invention at a content at which it can exhibit, when used in combination with the carbodiimide compound (B), an effect of improving resistance to hydrolysis and weather, in particular a synergistic effect of improving hydrolysis resistance.

Amount of the compound (C) is preferably 0.01 to 10 parts by weight, more preferably 0.1 to 5 parts by weight, particularly preferably 0.1 to 3 parts by weight based on 100 parts by weight of the biodegradable plastic. An amount less than 0.01 parts by weight may neither give an effect on adjustment or control of the biodegradation rate of the biodegradable plastic composition nor a synergistic effect with the carbodiimide compound (B), whereas an amount over 10 parts by weight may reduce the biodegradability of the biodegradable plastic, and furthermore may not produce the effect which reflects the amount.

In the present invention, the biodegradable plastic (A) may be incorporated with the carbodiimide compound (B) and compound (C) by dissolving these compounds in an organic solvent and then distilling off the solvent. It is preferable that the organic solvent can dissolve the biodegradable plastic, and is free of nonpolymerizable, active hydrogen. More specifically, the organic solvents useful for the present invention include chloroform and tetrahydrofuran (THF).

In the present invention, mixing of the above-described carbodiimide compound (B) and compound (C) with the biodegradable plastic (A) can be performed by melt mixing using an extruder, or adding the carbodiimide compound (B) and compound (C) after the termination of synthesis of the biodegradable plastic.

The melt mixing may be performed by one of the following methods:

(1) Mix the carbodiimide compound (B) and compound (C), into which the biodegradable plastic (A) is mixed.

(2) Mix the biodegradable plastic (A) and any one of the carbodiimide compound (B) and compound (C), into which the remainder is mixed.

(3) Mix the biodegradable plastic (A) and carbodiimide compound (B), into which a mixture of the biodegradable plastic (A) and compound (C) is mixed.

(4) Simultaneously mix the biodegradable plastic (A), carbodiimide compound (B) and compound (C).

Biodegradation rate of the biodegradable plastic of the present invention can be adjusted by type and amount of the carbodiimide compound (B) and the compound (C) to be compounded, and the type and the amount of the above to be compounded may be determined depending on a specific purpose of the biodegradable plastic composition.

4. Other Additives and the Like

The biodegradable plastic composition of the present invention may be further compounded with one or more additives within a range not to impair the effects of the present invention. These additives include reinforcing agents, clays, inorganic or organic fillers, amine-, phenol- or phosphorus-based antioxidants, heat stabilizers, hindered amine type light stabilizers and UV absorbers, as well as flame retardants, lubricants, waxes, colorants, crystallization promoters and degradable organic substances such as starch, if necessary.

The biodegradable plastic composition of the present invention can be stably adjusted in biodegradation rate, and has greatly improved resistance to hydrolysis and weather, in particular the former, and durability resulting from the improved resistances. Therefore it can be suitably used as materials for agriculture, forestry and fishery (mulch films, mulch sheets, plantation pots, fishing lines, fishing nets, and the like); materials for civil engineering works (waterholding sheets, nets for plants, sandbags, and the like); and molded articles, extrudates, blow-molded articles, thermally molded articles, fibers, non-woven fabrics, films for packing/container fields, in particular, molded articles of biodegradable plastic such as films, sheets, fibers, bottles and trays.

EXAMPLES

Hereinbelow, the present invention will be explained in more detail using Examples, which by no means limit the present invention. Physical properties in Examples and Comparative Examples were measured and evaluated by the following methods.

Hydrolysis Resistance

Each test sample piece was left in an air-conditioned chamber maintained at 80° C. and 90% RH for a fixed period (200, 150 or 100 hours), and ratios (%) of tensile strength and elongation after the test to the values before the test were calculated. Hydrolysis resistance was ranked as "good" for the sample with high ratios (%) of tensile strength and elongation.

Weather Resistance

Each test sample piece was exposed to light from a xenon lamp under the conditions of BPT (Black Panel Temperature) 50° C.×60% for 2000 hours, and ratios (%) of tensile strength and elongation after the test to the values before the test were calculated. Weather resistance was ranked as "good" for the sample with high ratios (%) of tensile strength and elongation.

Before describing Examples and Comparative Examples, synthesis methods for carbodiimide compounds will be described first.

Synthesis Example 1 for a Carbodiimide Compound 4,4'-dicyclohexylmethane diisocyanate was treated for carbodiimidation at 185° C. for 24 hours in the presence of 3-methyl-1-phenyl-2-phospholene-1-oxide as a carbodiimidation catalyst, incorporated at 0.5 parts by weight based on 100 parts by weight of the diisocyanate. The resulting carbodiimide compound with isocyanate group at the terminal had an NCO % of 2.4 and average polymerization degree of 15.

Examples 1 to 3

An aliphatic polyester resin as the biodegradable plastic (A), mainly composed of polybutylene succinate/adipate, carbodiimide compound (B) and compound (C) was dry blended, followed by mixing in a twin screw extruder to prepare a film with a thickness of 200 μm through T-die. The compounds (B) for Examples 1 to 3 were 1 part of "CARBODILITE HMV-10B®" as an aliphatic carbodiimide compound supplied by Nisshinbo Industries, Inc., "CARBODILITE HMV-8CA®" supplied by Nisshinbo Industries, Inc. and "STABAXOL P" supplied by Bayer AG, respectively. The compound (C) for Examples 1 to 3 was 0.5 parts of 2-[2'-hydroxy-3',5'-bis(α, α-dimethylbenzyl)phenyl] benzotriazole as a benzotriazole-based compound ("TINUVIN 234®" supplied by Ciba Specialty Chemicals). All part(s) by weight were based on 100 parts by weight of the component (A). Each film was punched by a JIS No. 4 dumbbell to prepare the test piece, which was evaluated for its resistance to weather and hydrolysis (test period: 200 hours). Table 1 gives the compositions and evaluation results.

Comparative Examples 1 to 3

A film was prepared in each of Comparative Examples 1 to 3 in the same manner as in each of Examples 1 to 3, except that the compound (C) was not compounded, to evaluate its resistance to weather and hydrolysis (test period: 200 hours). Table 1 gives the compositions and evaluation results.

TABLE 1

| | | | | | | |
|---|---|---|---|---|---|---|
| Polybutylene succinate/adipate | 100 | 100 | 100 | 100 | 100 | 100 |
| Polylactic acid | — | — | — | — | — | — |
| (B) Carbodiimide compound | | | | | | |
| CARBODILITE HMV-10B | 1 | — | — | 1 | — | — |
| CARBODILITE HMV-8CA | — | 1 | — | — | 1 | — |
| STABAXOL P | — | — | 1 | — | — | 1 |

TABLE 1-continued

| (C) Specified compound | | | | | | |
|---|---|---|---|---|---|---|
| TINUVIN 234 (ultraviolet absorber) | 0.5 | 0.5 | 0.5 | — | — | — |
| 2. Evaluation results | | | | | | |
| (1) Weather resistance Strength ratio (%) | 93 | 91 | 73 | 48 | 42 | 17 |
| Weather resistance Elongation ratio (%) | 91 | 92 | 81 | 35 | 30 | 5 |
| (2) Hydrolysis resistance*1 Strength ratio (%) | 93 | 91 | 91 | 43 | 31 | 27 |
| Hydrolysis resistance*1 Elongation ratio (%) | 91 | 92 | 88 | 35 | 20 | 24 |

*1 Tested at 80° C. and 90% RH for 200 hours

As shown in Table 1, which compares the results of Examples 1 to 3 with those of Comparative Examples 1 to 3, it is apparent that the carbodiimide compound (B) and compound (C) produce a synergistic effect for improving resistance to hydrolysis and weather.

Examples 4 to 11

A film was prepared in Example 4 in the same manner as in Example 1, except that an aliphatic polyester resin as the biodegradable plastic (A), mainly composed of polylactic acid, the carbodiimide compound prepared in Synthesis Example 1 to have isocyanate group at the terminal as the compound (B) and benzotriazole-based compound (C) (2-(2'-hydroxy-3'-t-butyl-5'-methylphenyl)-5-chlorobenzotriazole, "TINUVIN 326®" supplied by Ciba Specialty Chemicals) were compounded, to evaluate its resistance to weather and hydrolysis (test period: 150 hours). Table 2 gives the composition and evaluation results.

A film was prepared in each of Examples 5 to 11 in the same manner as in Example 1, except that a different composition was used, to evaluate its resistance to weather and hydrolysis (test period: 150 hours). Table 2 gives the compositions and evaluation results.

The compound (C) used in Examples 10 and 11 was 2-[4,6-bis(2,4-dimethylphenyl)-1,3,5-triazin-2-yl]-5-[(octyl)oxy]phenol as a triazine-based compound ("CYASORB UV-1164®" supplied by Cytec Industries).

Comparative Examples 4 to 8

A film was prepared in each of Comparative Examples 4 to 8 in the same manner as in Example 1, except that a different composition was used, to evaluate its resistance to weather and hydrolysis (test period: 150 hours). Table 2 gives the composition and evaluation results.

A film was prepared in the absence of specified compound (C) in each of Comparative Examples 4 to 6, and in the absence of carbodiimide compound in Comparative Example 8. Comparative Example 7 used an oxazoline-based compound in place of specified compound (C) and carbodiimide compound (B).

TABLE 2

| | Example 4 | Example 5 | Example 6 | Example 7 | Example 8 | Example 9 | Example 10 | Example 11 | Comparative Example 4 | Comparative Example 5 | Comparative Example 6 | Comparative Example 7 |
|---|---|---|---|---|---|---|---|---|---|---|---|---|
| 1. Composition (parts by weight) (A) Biodegradable plastic | | | | | | | | | | | | |
| Polylactic acid | 98.5 | 99 | 98.5 | 94.5 | 94 | 98.5 | 98.5 | 98.5 | 99 | 99 | 99 | 99 |
| (B) Carbodiimide compound | | | | | | | | | | | | |
| Compound prepared in Synthesis Example 1 to have isocyanate group at the terminal | 1 | — | — | — | — | — | — | — | 1 | — | — | — |
| CARBODILITE HMV-8CA | — | 0.5 | 1 | 5 | 1 | — | 1 | 1 | — | 1 | — | — |
| STABAXOL P | — | — | — | — | — | 1 | — | — | — | — | 1 | — |
| (C) Specified compound | | | | | | | | | | | | |
| CYASORB UV-1164 | — | — | — | — | — | — | 0.5 | 0.25 | — | — | — | — |
| TINUVIN 326 | 0.5 | 0.5 | 0.5 | 0.5 | 5 | 0.5 | — | 0.25 | — | — | — | — |
| (D) oxazoline-based compound | | | | | | | | | | | | |
| 2,2'-m-phenylenebis (2-oxazoline) | — | — | — | — | — | — | — | — | — | — | — | 1 |
| 2. Evaluation results | | | | | | | | | | | | |
| (1) Weather resistance Strength ratio (%) | 91 | 93 | 86 | 90 | 89 | 80 | 88 | 86 | 51 | 49 | 27.5 | 43 |
| (2) Hydrolysis resistance*1 Strength ratio (%) | 98 | 67 | 73 | 84 | 81 | 71 | 64 | 71 | 37 | 35 | 23 | 0 |

*1 Tested at 80° C. and 90% RH for 150 hours

Examples 12 and 13

A film was prepared in Example 12 in the same manner as in Example 1, except that a polyester resin mainly composed of polybutylene succinate/adipate/terephthalate ("ENPOL G 8002®" supplied by Ire Chemical), aliphatic carbodiimide compound ("CARBODILITE HMV-8CA®" supplied by Nisshinbo Industries) and benzotriazole were used as the biodegradable plastic (A), carbodiimide compound (B) and compound (C), respectively, to evaluate its hydrolysis resistance (test period: 100 hours). Table 3 gives the composition and evaluation results.

A film was prepared in Example 13 in the same manner as in Example 1, except that a polyester resin mainly composed of polybutylene succinate/adipate/terephthalate, aliphatic carbodiimide compound ("CARBODILITE HMV-8CA®" supplied by Nisshinbo Industries) and benzotriazole (2-(3,5-di-t-butyl-2-hydroxyphenyl)-5-chlorobenzotriazole, "TINUVIN 327®" supplied by Ciba Specialty Chemicals) were used as the biodegradable plastic (A), carbodiimide compound (B) and compound (C), respectively, to evaluate its hydrolysis resistance (test period: 100 hours) Table 3 gives the composition and evaluation results.

Comparative Examples 9 to 12

A film was prepared in each of Comparative Examples 9 to 12 in the same manner as in Example 1, except that a different composition was used, to evaluate its hydrolysis resistance (test period: 100 hours). Table 3 gives the composition and evaluation results.

Comparative Example 9 used an epoxy compound in place of a specified compound (C) and carbodiimide compound (B). Comparative Example 10 used an epoxy compound in place of a carbodiimide compound (C). Comparative Example 11 used 2,2'-dihydroxy-4-methoxybenzophenone ("CYASORB UV-24®" supplied by Cytec Industries) as a benzophenone-based ultraviolet absorber in place of a specified compound (C). Comparative Example 12 used 2-(3,5-di-t-butyl-2-hydroxyphenyl)-5-chlorobenzotriazole ("TINUVIN 327®" supplied by Ciba Specialty Chemicals) as a benzotriazole-based compound (C), but no carbodiimide compound (B) as was the case with Comparative Example 8.

biodegradable plastic composition of the present invention comprising a biodegradable plastic (A) compounded with a carbodiimide compound (B) and specified compound (C) exhibited much higher resistance to hydrolysis and weather, in particular resistance to biodegradation induced by hydrolysis, than the composition free of compound (B) or (C), e.g., those prepared in Comparative Examples 1 to 6, 8 and 12.

It was also found that the biodegradable plastic composition of the present invention compounded with a varying content of carbodiimide compound had hydrolysis resistance improving roughly in proportion to carbodiimide content (Examples 5 to 8). Thus, biodegradation rate can be stably controlled by its content.

On the other hand, the compositions prepared in Comparative Examples to contain a compound similar to a carbodiimide compound (B) or specified compound (C) was found to show no improvement in hydrolysis resistance, where an oxazoline compound was used in Comparative Example 7, epoxy compound in Comparative Examples 9 and 10, and benzophenone-based ultraviolet absorber in Comparative Example 11. It is particularly noted that the composition prepared in Example 13 to contain a specified benzotriazole-based ultraviolet absorber as the compound (C) is much more resistant to hydrolysis than the one prepared in Comparative Example 11 to contain a benzophenone-based ultraviolet absorber.

The biodegradable plastic composition of the present invention, characterized in that it comprises a biodegradable plastic (A) compounded with specified amounts of a carbodiimide compound (B) and compound (C), shows notable advantages because it can be stably adjusted in biodegradation rate, and has greatly improved resistance to hydrolysis and weather, in particular the former, and durability resulting from the improved resistances.

Therefore it can be suitably used as materials for agriculture, forestry and fishery (mulch films, mulch sheets, plan-

TABLE 3

|  | Example 12 | Example 13 | Comparative Example 9 | Comparative Example 10 | Comparative Example 11 | Comparative Example 12 |
|---|---|---|---|---|---|---|
| 1. Composition (parts by weight) | | | | | | |
| (A) Biodegradable plastic | | | | | | |
| Polybutylene succinate/adipate/terephthalate | 98.5 | 98.5 | 99 | 98.5 | 98.5 | 100 |
| (B) Carbodiimide compound | | | | | | |
| CARBODILITE HMV-8CA | 1 | 1 | — | — | 1 | — |
| (C) Specified compound | | | | | | |
| Benzotriazole | 0.5 | — | — | — | — | — |
| TINUVIN 327 | — | 0.5 | — | 0.5 | — | 0.5 |
| (D) Epoxy compound | | | | | | |
| Phenylglycidyl ether | — | — | 1 | 1 | — | — |
| (D) Benzophenone-based ultraviolet absorber | | | | | | |
| CYASORB UV-24 | — | — | — | — | 0.5 | — |
| 2. Evaluation results | | | | | | |
| ② Hydrolysis resistance*1 Strength ratio (%) | 72 | 77 | 28 | 29 | 45 | 21 |

*1Tested at 80° C. and 90% RH for 100 hours

As obvious from the results of Examples and Comparative Examples shown in Table 1-3, it was found that the tation pots, fishing lines, fishing nets, and the like); materials for civil engineering works (water-holding sheets, nets for plants, sandbags, and the like); and molded articles, extrudates, blow-molded articles, thermally molded articles, fibers, non-woven fabrics, films for packing/container fields, in particular, molded articles of biodegradable plastic such as films, sheets, fibers, bottles and trays.

What is claimed is:

1. An aliphatic polyester composition comprising (A) 100 parts by weight of aliphatic polyester, (B) 0.01 to 10 parts by weight of a carbodiimide compound, and (C) 0.01 to 10 parts by weight of at least one compound selected from the group consisting of benzotriazole-, triazine- and hydroxylamine-based compounds.

2. The aliphatic polyester composition according to claim 1, characterized in that said triazine-based compound is a triazine-based ultraviolet absorber or triazine derivative having at least one amino group in the molecule.

3. The aliphatic polyester composition according to claim 1, characterized in that said hydroxylamine-based compound is N-hydroxybenzotriazole or N-hydroxysuccinimide.

4. The aliphatic polyester composition according to claim 1, characterized in that said carbodiimide compound (B) is aliphatic polycarbodiimide.

5. The aliphatic polyester composition according to claim 4, characterized in that said aliphatic polycarbodiimide compound has an isocyanate terminal.

6. A molded article of a aliphatic polyester obtained by molding the aliphatic polyester composition according to any one of claims 1, 2, 3, 4 or 5.

7. The molded article of the aliphatic polyester according to claim 6, which is in the form of molded article, extrudate, blow-molded article, thermally molded article, fiber, non-woven fabric, film or sheet.

8. A method for controlling a biodegradation rate an aliphatic polyester, characterized in that the aliphatic polyester (A) is compounded with a carbodiimide compound (B) and at least one compound (C) selected from the group consisting of benzotriazole-, triazine- and hydroxylamine-based compounds to adjust its biodegradability, wherein said biodegradation rate is controlled by altering proportions of said carbodiimide compound (B) and said at least one compound (C) selected from the group consisting of benzotriazole-, triazine- and hydroxylamine-based compounds.

* * * * *